United States Patent [19]
Krakow

[11] 3,781,509
[45] Dec. 25, 1973

[54] METHOD AND DEVICE FOR WELDING ALIGNED SHEET METAL PLATES TOGETHER FOR FORMING A BAND FOR MAKING SPIRAL SEAM TUBES

[75] Inventor: Heinz Krakow, Hamburg, Germany
[73] Assignee: Blohm & Voss AG., Hamburg-Steinwerder, Germany
[22] Filed: May 13, 1971
[21] Appl. No.: 143,035

[30] Foreign Application Priority Data
June 4, 1970 Germany............... P 20 27 439.9

[52] U.S. Cl.............. 219/125 R, 90/15, 219/161
[51] Int. Cl............................................. B23k 9/12
[58] Field of Search.............. 219/124, 125 R, 126, 219/161, 101, 104; 228/4, 5; 90/15

[56] References Cited
UNITED STATES PATENTS
3,257,060  6/1966  Williams et al................ 219/161 X
3,307,764  3/1967  Robinson............................. 228/5
1,932,374  10/1933  Nenninger............................. 90/15
3,426,952  2/1969  Chew et al............................. 228/5
2,510,820  6/1950  Hermanson............................. 90/15

FOREIGN PATENTS OR APPLICATIONS
900,751  7/1962  Great Britain....................... 228/5

Primary Examiner—C. L. Albritton
Attorney—Benjamin E. Sherman et al.

[57] ABSTRACT

A continuous band for use in making spiral seam tubes is made by horizontally aligning sheet metal plates in a common horizontal plane and clamping each adjacent end of the plates separately. A milling cutter is introduced in a slot formed between the adjacent transverse edges of these plates to trim and chamfer these two transverse edges simultaneously. Thereupon at least one of the clamping devices for clamping one of the plates is moved toward the other clamping device holding the other plate so that a welding joint is formed between the two transverse edges, which are then welded together.

7 Claims, 3 Drawing Figures

METHOD AND DEVICE FOR WELDING ALIGNED SHEET METAL PLATES TOGETHER FOR FORMING A BAND FOR MAKING SPIRAL SEAM TUBES

The invention relates to a method and a device for producing transverse weldings when uniting sheet metal plates for making a band used in the manufacture of spiral seam tubes. The sheet metal plates prior to being welded together have to be aligned, milled and then the ends have to be welded together. The problem of such a method is to produce such a transverse welding connection within a very short period of time with a minor expenditure and an economical machine operation and of good quality.

It is an object of the invention to produce this welding operation at a single operating station where all individual working operations are completed and whereby the sheet metal plates with respect to their longitudinal edges are aligned. The ends of the sheet metal plates are clamped only once and released after the working operations are completed, whereby for the required milling operation at the transverse edges a single effective machine is employed.

Accordingly, the method of the invention provides that both ends of the sheet metal plates are first of all, aligned along their longitudinal edges, then each sheet metal plate is individually clamped in position in such a manner that they are a predetermined distance away from each other, and then the transverse edges are trimmed and chamfered, whereupon the sheet metal plates are parallel slidably displaced with respect to one another until the transverse edges form a welding joint. In this position the sheet metal plates are welded together and then they are released from the clamped position.

This method has a number of advantages.

First of all, the alignment of the sheet metal plates takes place along their longitudinal edges, which leads to a higher stress on the milling units which work on the transverse edges, but on the other hand a very uniform stress is exerted on the milling units along the longitudinal edges of the completed band. The feed of the band is determined by the band feed speed into the deformation station where the deformation into a tube takes place. In this manner, the band feed movement will be opposed by a uniform resistance caused by the longitudinal milling units, so that a most far reaching constant band feed speed is obtained which assures a correct deformation and a reliable welding of the tube.

In addition, in spite of only a single clamping of the band or of the sheet metal ends a sufficient wide working location for finishing the transverse edges in a single operating station is obtained and a very uniform welding joint is produced, so that the sheet metal plates are rectilinearly welded one to the other.

According to another object of the invention, both transverse edges of two adjacent sheet metal plates are at the same time trimmed and chamfered.

Another object of the invention is a device for performing the above described method. This device for the clamping of the bands or sheet metal plates is provided with two separate clamping devices. This construction forms the base for the spacial arrangement of the working location during the milling of the transverse edges on one hand and during the welding of the same on the other hand. In addition, the clamping devices are in their clamping action independent of each other and each end of the sheet metal plates to be welded together are separately clamped, while the releasing of the clamping action may be performed at the same time.

Each one of the clamping devices may be operated with a hydrostatically produced pressure and may act upon one or both sides of the sheet metal ends. This feature depends principally upon the condition whether one or the other face of the ends of the sheet metal constitutes the reference surface for the further working and deformation of the sheet metal band. A clamping pressure acting on both sides of the sheet metal plate is only then of importance when it is necessary to compensate a difference in elevation.

The slidable parallel displacement of the sheet metal plates, namely the parallel joining of the transverse edges, which have been finished while arranged a distance apart from each other, down to a distance which is equal to the welding joint, may be performed in different manners as far as the slidable drive and the slidable track are concerned, and for instance may be arc-shaped and performed in different planes. The type and the form of the parallel displacement depends substantially upon the selection of the tool which operates on the transverse edges.

Preferably the parallel displacement of the sheet metal plates is accomplished hydraulically and rectilinearly and along a straight track.

If possible the parallel displacement should take place in the plane of the sheet metal ends by a substantially horizontally displacement of the clamping devices with the assistance of the hydraulically operating tensioning devices along guide rails provided in the device. The device is made simpler when the parallel displacement is performed only by one of the two tensioning devices.

Concerning the shape of the tool which is used for working on the sheet metal plates, namely the tools for trimming and chamfering of the transverse edges of the same, a number of possibilities may be considered. The preparation of the transverse edges for the flame cutting method requires in general the shortest period of time and according to the time requirement is independent of the size of the sheet metal surface to be finished. This flame cutting method can be performed with success, however, only when the cutting surfaces are flat, which however is not always recommended when only one-sided welds are to be produced.

In such cases the tool for trimming and/or chamfering the transverse edges comprises a circumferential milling cutter. Such a circumferential milling cutter comprises in general a rotating milling head which in the present case is provided for the purpose of moving along the transverse edges with an adjustable driven feed system.

According to an important object of the invention, the peripheral milling cutters for trimming and chamfering may at the same time engage both opposed transverse edges, or in other words, a single milling head operates simultaneously on the two transverse edges. This results in a savings of operating time, while at the same time milling heads having a smaller diameter may be used which have a corresponding smaller rotary torque, which means that at the same speed a smaller power is required.

The greatest time saving and the highest work uniformity is, however, obtainable on both transverse edges of the sheet metal plates when a single peripheral milling cutter is employed which in accordance with the welding joint to be produced, for instance a V-shaped welding joint, has a correspondingly shaped cutter head which is capable of simultaneously trimming and chambering both transverse edges. Even if such a construction should require a somewhat greater rotary power, the savings in operating time and a very uniform welding joint are preponderate. This advantage will be increased still more when a milling unit comprising a milling head and a drive therefor is adjustable at right angles to the plane in which the sheet metal plates are disposed and when such a milling unit is pivotally arranged about a vertical axis, which is disposed outside of the drive axis of the milling unit but extends parallel to the same and also at right angles to the plane in which the sheet metal plates are arranged.

This construction furnishes a possibiity that by an adjustability of the milling unit in a vertical direction, the cross section of the welding joint may be varied and may be corrected by pivotally adjusting the milling unit.

Another object of the invention is to arrange the device stationary, for instance when producing a double length sheet metal strip, or the device may also be arranged portable in order to add another sheet to the produced band and move together with the same when introduced into the deformation station of the spiral seam tube mill. In the latter case, namely when the device is portable, it is an object of the invention to provide the carriage on which the device is mounted with its own drive which at least is capable to drive the carriage with the already clamped added sheet metal plate in accordance with the feed speed of the band of sheet metal plates which is introduced into the deforming station with an accelerated speed so that then the band produced in the device of the machine operates in synchronism with the drive roller drive of the spiral seam 2 mill.

With the foregoing and other objects in mind, the invention will now be described with reference to the accompanying drawings which diagrammatically illustrate an embodiment of the device of the invention. IN THE DRAWINGS.

Figure 1:
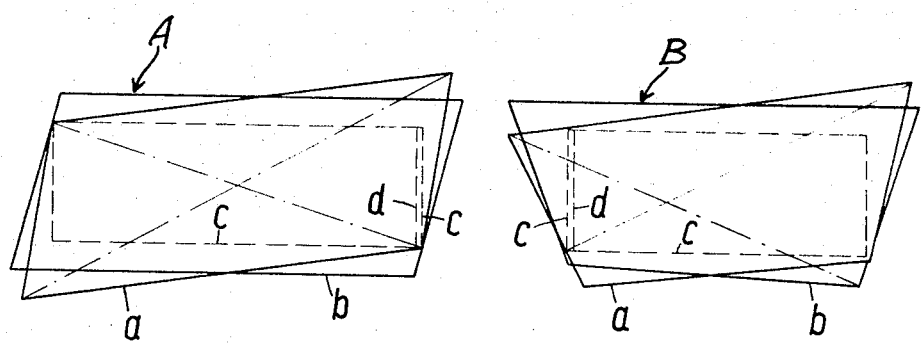
FIG. 1 illustrates diagrammatically the alignment of a sheet metal plate along its longitudinal edges.

Referring to FIG. 1, the same illustrates diagrammatically and in a distorted scale with reference to the working tools and the dimension tolerance and the allowed non-angularity two sheet metal plates which are to be prepared. The two sheet metal plates A and B are illustrated in different alignment positions. The alignment of the sheet metal plates with reference to the work to be performed by the transverse milling tool and the finally remaining length is designated by $a$, while the alignment with reference to the longitudinal edges according to the invention is designated by $b$, and the finally remaining shape and size of the sheet metal plate after all of its edges have been worked upon is indicated by $c$ and $d$, respectively. The advantages which are obtained when the length of the sheet metal plates remains uniform as possible, so that along both longitudinal edges the work resistance remains substantially the same, have been explained previously.

Figure 2:
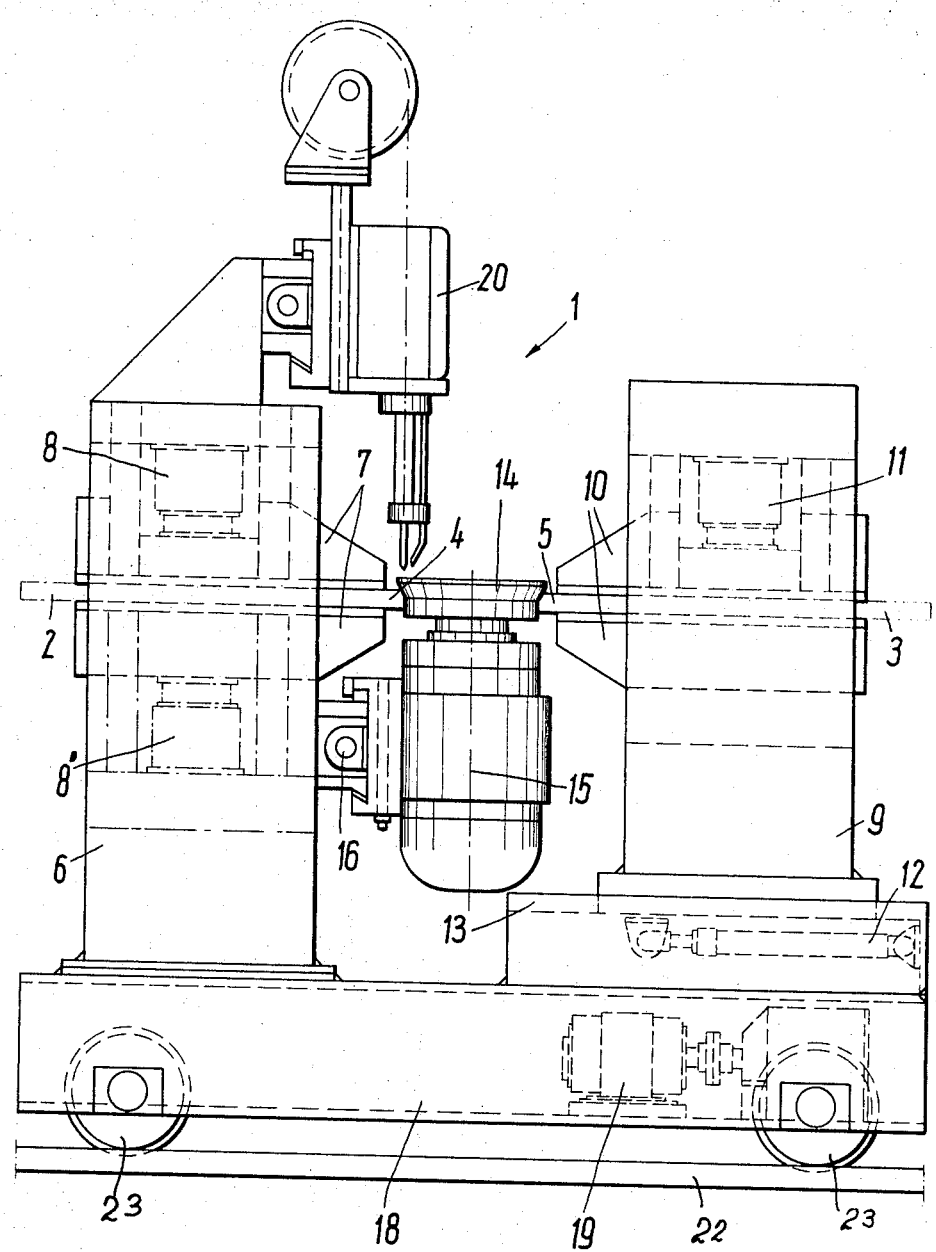
FIG. 2 is a side elevation view of the device.
Figure 3:
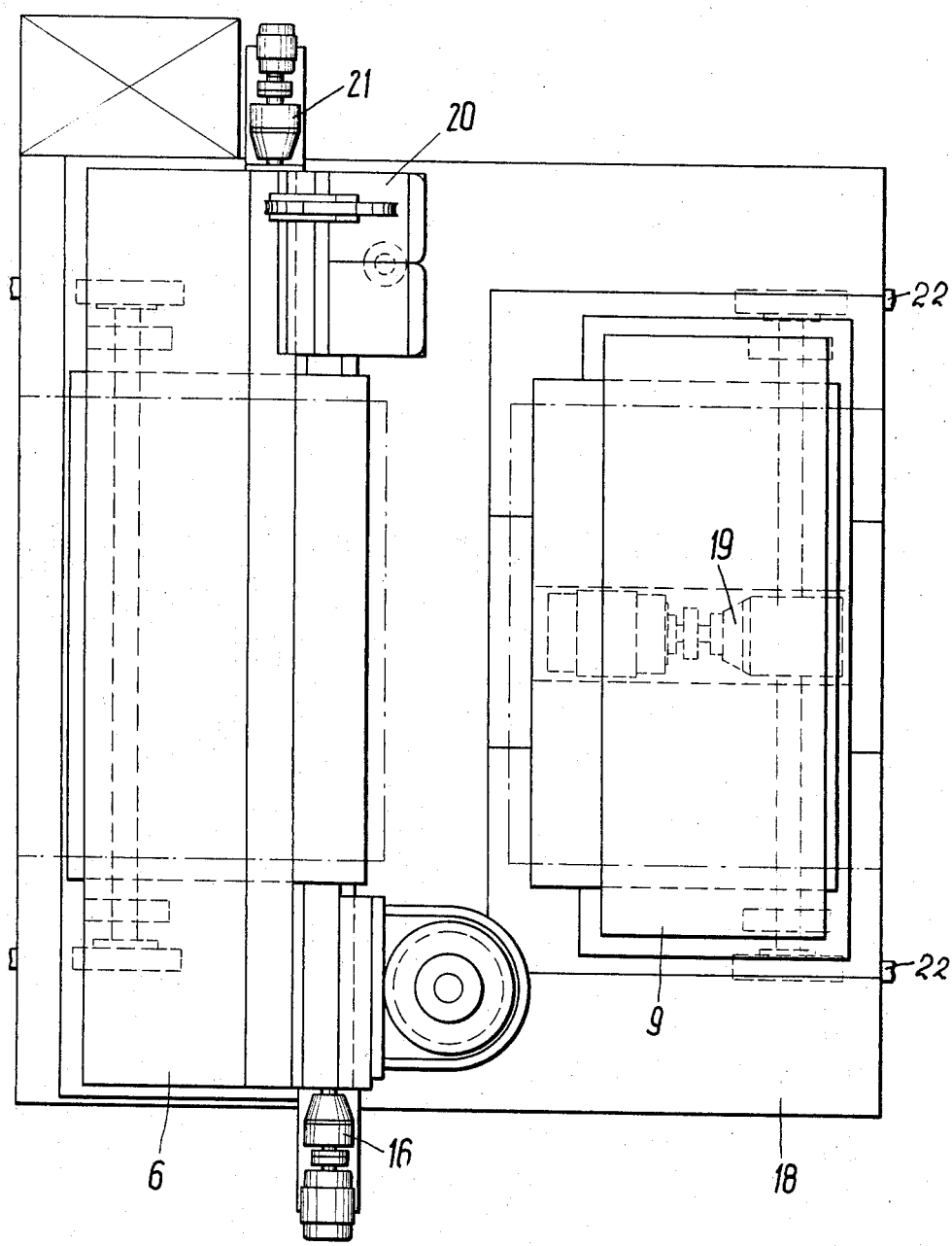
FIG. 3 is a top elevation view of a device constructed in accordance with the invention.

Referring to the FIGS. 2 and 3, the same illustrate a device 1 provided with two separate clamping devices 6 and 9 wherein are clamped the two sheet metal ends 2 and 3, respectively. The clamping devices 6 and 9 are equipped with pairs of clamping jaws 7 and 10 and pressure producing systems 8 and 11, respectively. Opposed to the pressure producing system 8 which acts upon the top surface of the sheet metal plate 2 is another pressure producing system 8' which acts upon the lower face of the sheet metal plate 2.

The clamping device 9 is adapted to be slidably adjusted along horizontal guide rails 13 by means of a hydraulic piston-cylinder device 12.

A milling head 14 which is introduced into a slot formed between the opposed transverse edges 4 and 5 of the sheet metal plates 2 and 3, is rotatable about a vertical axis and is driven by a drive device 15 whose axis is arranged vertically and is in axial alignment with the axis of the milling head 14. The parts 14 and 15 form a milling unit which as a whole is adapted to be horizontally moved by a feed device 16 so that the milling cutter 14 moves along the entire length of the transverse edges 4 and 5. Furthermore, the milling unit 14 and 15 is pivotally arranged about an axis 17 disposed outside the common drive axis of the milling unit 14 and 15 or parallel thereto, and also at right angles to the plane of the sheet metal plates 2 and 3. The milling head 14 has such a shape that it produces between the transverse edges 4 and 5 the desired welding joint profile which in the present case is V-shaped.

The entire device 1 is mounted on a carriage 18 provided with traction wheels 23 moved along horizontal rails 22. A drive device 19 is used for causing the carriage 18 with the device 1 thereon to move along the rails 22.

The welding operation itself is performed by a welding device 20 which is provided with a drive 21 to move it along the welding joint formed between the transverse edges 4 and 5 of the sheet metal plates 2 and 3. The welding is performed by a three-conductor welding tool, or in other words the welding puddle is produced by three electrodes.

What I claim is:

I claim:

1. Device for producing transverse welds in aligned metal plates for producing a band from which spiral seam tubes are made, comprising two separate clamping devices for separately clamping two sheet metal plates arranged in a common horizontal plane with their opposed transverse edges horizontally spaced from one another means for horizontally displacing at least one of said clamping devices for moving said sheet metal plates toward one another so as to form a welding joint between said transverse edges, a rotary driven peripheral milling cutter for simultaneously trimming and chamfering the transverse edges of the sheet metal plates, means for pivotally mounting said cutter to enable it to swing in said horizontal plane and follow the transverse edge of one of said metal plates, said horizontal displacing means including means for holding said opposed transverse edges against said cutter, means for welding said joint.

2. Device according to claim 1, including guide track means and hydraulically operated means for operating said means for horizontally displacing said clamping device along said guide track means.

3. Device according to claim 2, which is mounted on a frame, said guide track means comprises a horizontal guide rail mounted in the frame of the device.

4. Device according to claim 1, where in said rotary peripheral milling cutter is provided with a milling portion for producing a V-shaped welding joint in said two opposed transverse edges of said sheet metal plates.

5. Device according to claim 1, said rotary peripheral milling cutter for trimming and chamfering the transverse edges of said sheet metal including drive means, said drive means and said milling cutter forming a unit having a common axis extending at right angles to the horizontal plane of said two sheet metal plates said means for pivotally mounting said unit being located along an axis arranged parallel to said common axis and at right angles to said plane in which said two sheet metal plates are arranged.

6. Device according to claim 1, including a carriage on which said device is mounted, and means for driving said carriage.

7. Device according to claim 1 including means for moving said cutter horizontally along the entire length of said transverse edges.

* * * * *